April 1, 1941.     C. H. CLEVELAND     2,237,070
FLUID PRESSURE REGULATOR AND FLOW CONTROL DEVICE
Filed May 23, 1939     5 Sheets-Sheet 1

Fig. 1.

Inventor
C. H. Cleveland,
By Barry & Cyr
Attorneys.

April 1, 1941.  C. H. CLEVELAND  2,237,070

FLUID PRESSURE REGULATOR AND FLOW CONTROL DEVICE

Filed May 23, 1939  5 Sheets-Sheet 3

Inventor
C. H. Cleveland,
By Barry & Cyr
Attorneys

April 1, 1941.   C. H. CLEVELAND   2,237,070
FLUID PRESSURE REGULATOR AND FLOW CONTROL DEVICE
Filed May 23, 1939   5 Sheets-Sheet 4

Inventor
C. H. Cleveland,
By Barry & Cyr
Attorneys

Patented Apr. 1, 1941

2,237,070

UNITED STATES PATENT OFFICE 2,237,070

FLUID PRESSURE REGULATOR AND FLOW CONTROL DEVICE

Charles H. Cleveland, Detroit, Mich.

Application May 23, 1939, Serial No. 275,289

15 Claims. (Cl. 50—17)

This invention relates to improvements in flow control devices and more especially to novel means for controlling the flow and pressure of illuminating gas or heating gas supplied to a large number of consumers in a city or the like. The present application is a continuation-in-part of my application Serial No. 227,820 filed August 31, 1938, and is directed specifically to improving the apparatus disclosed in my Patent No. 2,071,871 dated Feb. 23, 1937.

In my patent, I pointed out that it is well known in cities or the like where a large number of consumers use gas conveyed by pipe lines that the flow and pressure in the outlet or low pressure lines have a tendency to fluctuate owing to the fact that the pressure is not constant in the inlet or high pressure line and due to the fact that the volume of gas consumed varies to a great degree, especially during meal hour periods. Many efforts were made to remedy the disadvantage without a practical solution of the problem up to the time of my patented invention.

The primary purpose of the present invention is to improve the original apparatus and provide a simple, durable and practical device which will act to maintain a pressure at the point of consumption that does not vary regardless of amount of consumption, even though there is a great variation in the volume of gas consumed and large fluctuations of the pressure of the gas from the source of supply.

In order that the invention may be clearly understood, it is deemed advisable at the beginning to point out the difference in operation of a regulator equipped with flow control means, as compared to one that is not. Briefly, a pressure regulator is designed to maintain a constant pressure at the point where it is located. In a conduit leading away from it, at a considerable distance away from the regulator, the pressure fluctuates directly with the volume of fluid through the conduit. This is due to frictional resistance to flow in the conduit. This fluctuation of pressure at points most remote from the regulator is the point or points where it is more desired to maintain a uniform pressure, and is the condition which those concerned with the distribution of fluid through a system of conduits have been trying to obtain, and it is what I accomplish by my present improvement, which reverses the usual action of such devices. The pressure in the conduit at the regulator varies or fluctuates with any change in volume of flow, and remains constant at the remote points of the distribution conduit.

Another object of the present invention is to provide certain improvements in the construction of my original apparatus that reduce friction to the lowest possible amount; make the device more sensitive; and render it easier to regulate or adjust.

With the foregoing objects outlined and with other objects in view which will appear as the description proceeds, the invention consists in the novel features hereinafter described in detail in connection with the accompanying drawings and more particularly pointed out in the appended claims.

Referring to Figs. 1 to 6 inclusive of the drawings, 3 designates a pipe line that is divided by a flow control device, such as a balanced valve 4, into an inlet or high pressure conduit 5 and an outlet or low pressure conduit 6. Means 7, such as an orifice plate, is interposed in the low pressure line for restricting the volume of flow so as to create a pressure differential at opposite sides of the orifice plate which varies proportionately with the volume of flow through said plate.

Figure 2:
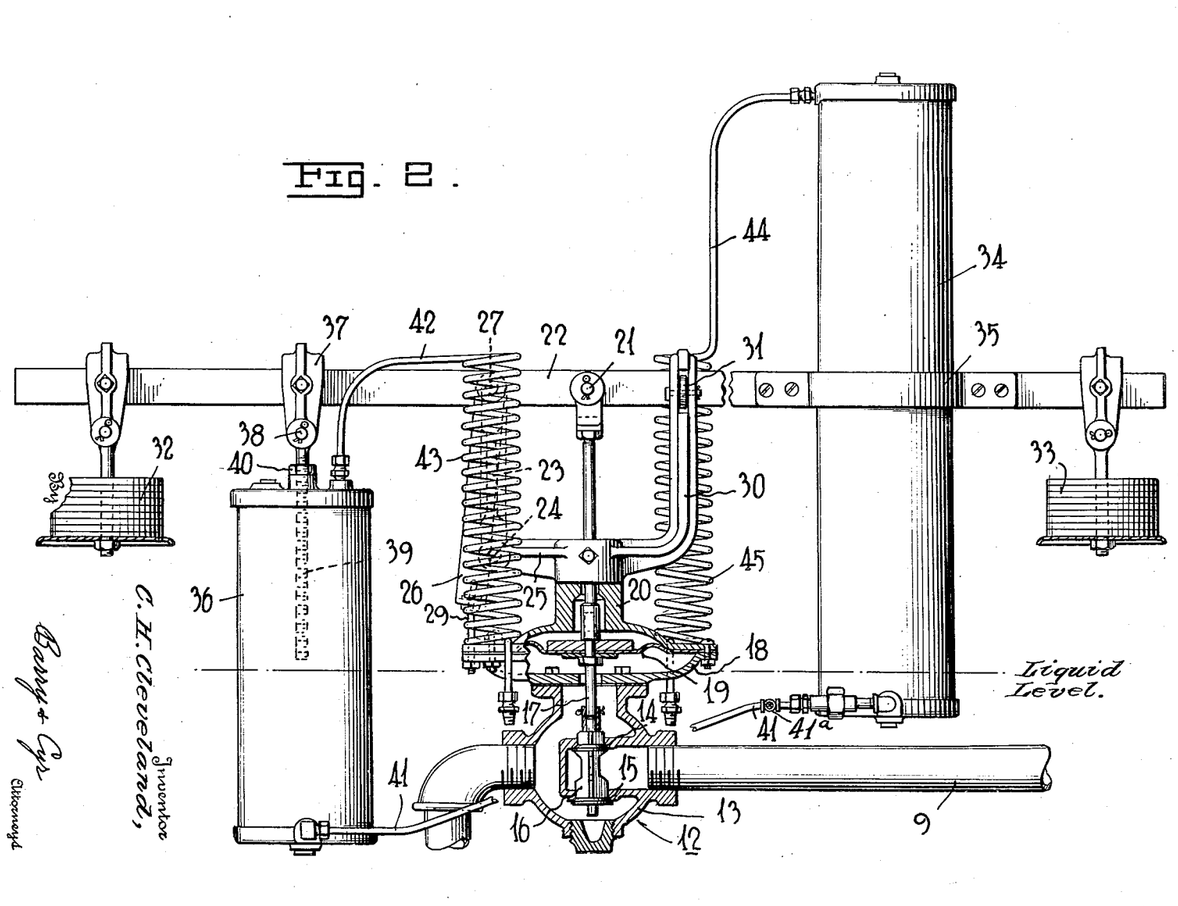
Fig. 2 is an enlarged similar view of a portion of the same.
Figure 3:
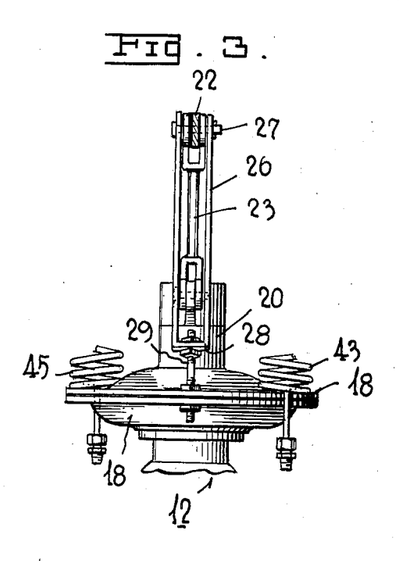
Fig. 3 is an elevation of a detail partly broken away and partly in section and illustrating the means for adjusting mounting the fulcrum bar.
Figure 4:
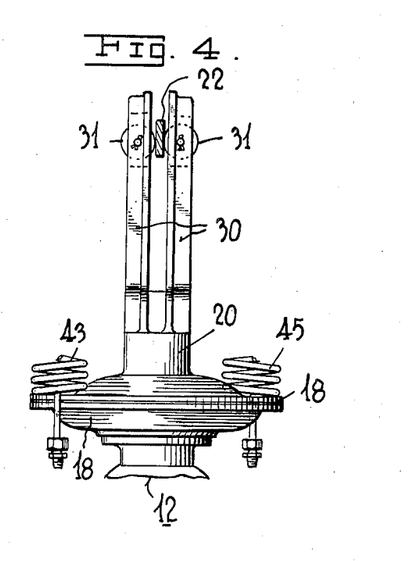
Fig. 4 is a similar view illustrating the means for guiding the fulcrum bar.
Figure 5:
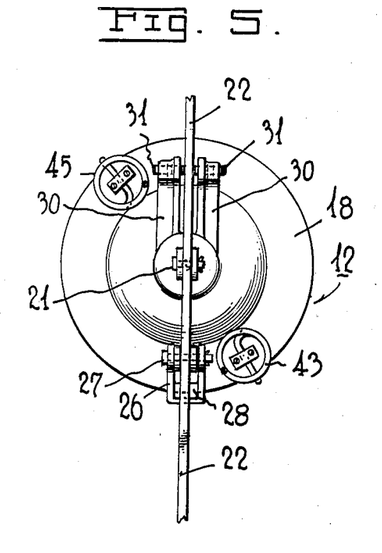
Fig. 5 is a top plan view partly broken away of the means for mounting and guiding the fulcrum bar.
Figure 6:
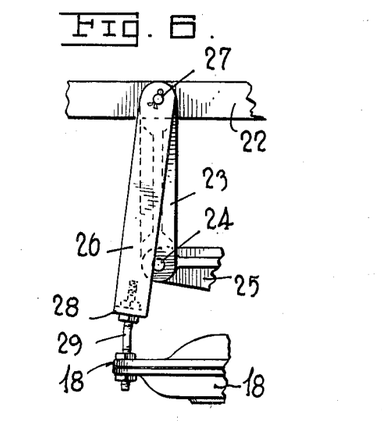
Fig. 6 is a side elevational view of a detail showing means employed in adjusting the fulcrum link.

A by-pass pipe, conduit or pasageway 9 permits the fluid to flow from the conduit 5 at the upstream side of the valve 4 to the conduit 6 at the downstream side of the orifice plate, but the flow of the fluid through the by-pass pipe is controlled by special means. The following control members are interposed in the by-pass pipe in the order named. First, a high pressure stabilizing regulator 10, a needle valve or the like 11 and a low pressure pilot regulator 12. The element 10 may be a conventional stabilizing regulator for reducing the pressure on the fluid before it reaches the valve 11, and the latter will function to restrict the flow toward the pilot regulator 12. The latter is preferably constructed as best illustrated in Fig. 2. It may consist of a globular casing 13 having a pair of valve seats 14 and 15 which cooperate with a balanced valve head 16 that is suspended from a rod 17. A diaphragm casing 18 is mounted on the casing 13 and contains a diaphragm 19 which is affected by pressures existing in the casing 13 and also prevents leakage of fluid along the stem 17. The latter passes through the diaphragm and its casing and also through a tubular member 20 at the top of the casing 18, and the upper end of the stem is pivotally connected at 21 to a fulcrum bar 22. The latter is pivotaly supported by a fulcrum link 23, best shown in Figs. 3, 5 and 6. The lower end of the link is pivotally mounted at 24 on an arm 25 of the tubular member 20, and for the purpose of adjusting the fulcrum bar to maintain the stem 17 out of contact with the wall of the hole in the member 20, I employ an auxiliary link 26. The latter is in the form of a cleavis, which has its upper end pinned to the fulcrum bar at 27 by the same pin which supports the bar by the link 23. The lower end of the link 26 is provided with a cross head 28 that is adjustably secured (threaded adjustment) to a pin 29 upstanding from the diaphragm casing 18.

A second arm 30 extends upwardly from the member 20 and its upper end is bifurcated and provided with guide wheels 31 which engage opposite sides of the fulcrum bar to maintain it steady during its movements.

For control purposes, the opposite ends of the fulcrum bar are provided with adjustable weights 32 and 33 each of which may be moved along the bar if necessary.

The fulcrum bar is provided at one side of its fulcrum point 27 with a liquid-containing tank 34 which may be fixedly secured to the bar by means of a clamp 35. At the opposite side of the fulcrum point 27, the bar supports a liquid-containing tank 36 that is adjustable both vertically and lengthwise of the bar. For this purpose, an adjustable support 37 which may be moved along the bar, carries a pin 38 from which a threaded rod 39 is suspended. This rod has a threaded connection with the tank 36 and is provided with a lock nut 40 for securing the tank in adjusted positions. The bottom portions of the tanks communicate with one another through the instrumentality of a flexible tube 41 so that the liquid may transfer from one tank to the other. A manually operated valve 41a or the like is interposed in the tube 41 to restrict the flow through that tube to any minimum desired.

A tube 42 having a coiled portion 43 that rests on the casing 18 communicates with the pipe 5 at the upstream side of the orifice plate 7. This tube is connected to the top of the tank 36 so that pressure at the upstream side of the orifice plate is exerted in the tank 36.

A similar tube 44 having a coiled portion 45 places the top of the tank 34 in communication with the pipe 6 at the downstream side of the orifice plate.

In the present invention, the operating pressure is the difference in pressure across the orifice or flow-restricting means 7. As the orifice or flow-restricting means has an opening of fixed size, any increase in flow through the control valve 4 will require a higher pressure on the upstream side of the orifice in order to force an increased flow of fluid through the fixed opening.

In practice, the tank 36 is filled to about one inch of its top with liquid, and by a gravity flow through line 41 the liquid will rise about one inch in the bottom of tank 34, at which time the major portion of the liquid is in tank 36 and acting as a closing agent on the valve head 16 of pilot regulator 12. Now sufficient weight is applied at 33, as opening weight, to balance the pilot regulator diaphragm 19 on the minimum or no flow pressure required in the low pressure fluid conduit 6. With no flow through orifice 7 any amount of static head in the fluid conduit 6 is transferred through lines 42 and 44 to the two containers 36, 34 without changing the relative level of the liquid, because the pressure is the same on the liquid surface of each tank, and this will hold true as long as there is no flow through orifice 7. Any flow through this orifice, however, caused by the opening of the control valve 4 of the master regulator, will cause an immediate change or difference in pressure across the orifice; the amount of which, of course, depending on the amount of flow and the area of the orifice.

This change or difference in pressure is transferred through lines 42 and 44 to the surface of the liquid in tanks 36 and 34, and as line 42 is on the upstream side of the orifice, it will conduct the higher pressure, and this acting on the surface of the liquid in tank 36 will cause a transfer of liquid through line 41 into tank 34, until a sufficient head of liquid has been created to balance the difference in pressure acting through the two lines, and on the surface of the liquid in the two tanks; at the same time the transfer of liquid from tank 36 (as a closing weight) to tank 34 (as an opening weight) will cause an increase in opening weight on the pilot regulator 12, and through it an increase in pressure in conduit 6 to balance it, and this increase in pressure in conduit 6 compensates for the frictional loss for that rate of flow and allows the pressure at the distant terminal of the conduit 6 to remain constant.

Figure 1:
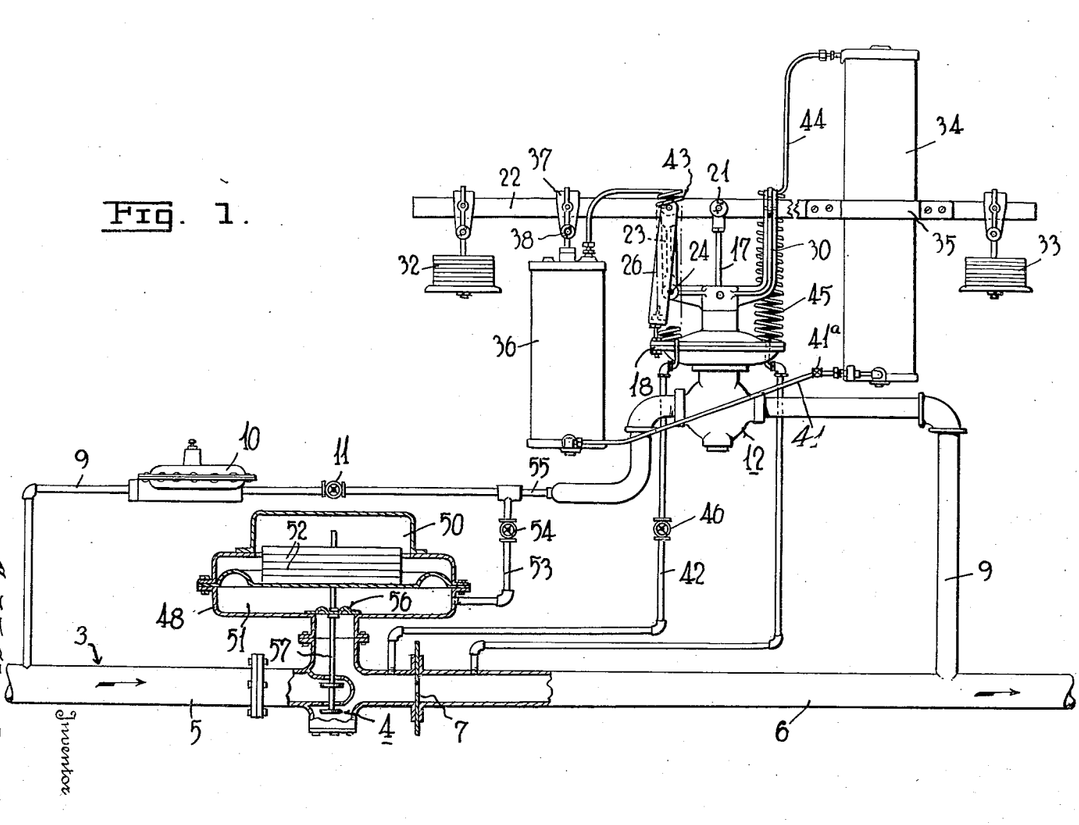
Fig. 1 is a side elevation partly in vertical section of a practical embodiment of my invention.

The main valve 4 is controlled by a pressure reducing regulator of any conventional make or design. For example, a casing 48 may be arranged above the valve and be divided by a movable partition or diaphragm 49 into first and second chambers 50 or 51; the first chamber accommodating suitable loading means, such as weights 52 for the diaphragm, and the other chamber permitting the pressure existing in the medial portion of the by-pass pipe to be felt by the diaphragm 49. For this purpose a tube 53 having a needle valve 54 interposed therein, places the medial portion 55 of the by-pass pipe in communication with the chamber 51. A flexible imperforate packing gasket 56 is arranged on the stem 57 of the main valve to segregate the chambers 51 and 8 from one another, and of course, the valve stem is secured to the diaphragm 49.

Instead of making the parts 11, 46 and 54 as needle valves, each of these parts may be replaced by any suitable equivalent such as an orifice plate.

In operation, let us assume that gas from a suitable source of supply is entering the conduit 5 of the equipment at a pressure of fifty pounds and it is desired to reduce such pressure and to maintain a pressure of substantially atmospheric in the outlet conduit 6. Under such circumstances, the regulator 10 will act to reduce the pressure of gas flowing through the by-pass pipe 9 to, say two pounds, and the flow-restricting means or valve 11 will reduce this pressure to, say one-half pound. The gas will flow past the valve 4 and also through the by-pass valve 9, and whenever the pressure in the outlet pipe tends to rise, the diaphragm 19 will also have a tendency to close the valve 16. As the result, flow will be restricted through the by-pass pipe, and by means of the tube 53, the by-pass pressure will be felt in the chamber 51 so that the diaphragm 49 acts to move the main valve 4 toward the closed position and thereby reduce the flow through the main line and also reduce the pressure on the upstream side of the orifice plate 7. Due to the falling of pressure at the upstream side of the orifice plate the liquid will have a tendency to flow from container 34 to container 36 so that the additional weight in the latter will tend to close the valve 16, and obviously the pressure in the low pressure line will not build up beyond a certain degree. On the other hand when the pressure is reduced in the pipe 6, the pressure in the valve casing 13 also reduces, and the diaphragm 19 moves downwardly and urges the valve 16 into open position. Then owing to the free flow of gas through the by-pass pipe, the diaphragm 49 can move downwardly and urge the main valve 4 toward open position with the result that the increase flow through the orifice 7 will cause a proportionate increase in the pressure differential across the orifice. Of course, this difference in pressure, acting through lines 42 and 44 and on the surface of the liquid in the containers will force sufficient liquid from 36 to 34 until a sufficient head of liquid is transferred to balance the increased differential in pressure; this transfer of liquid or weight applied to diaphragm 19 consequently requiring a higher pressure in line 6 to support or counter-balance the additional weight applied.

As a safety feature container 36 is so adjustable that the total amount of liquid that is transferred may be determined in advance. This in turn limits the amount of weight that can be applied to diaphragm 19 and the maximum pressure that is required in line 6 to counter-balance it, and the pressure in conduit 6 will remain at the maximum required regardless of any increase in pressure which may occur in the pressure differential across orifice 7. Therefore, it will be seen that this limiting feature is of vital importance as a safety factor as it prevents the pressure in conduit 6 from exceeding a predetermined maximum, and eliminates the possibility of creating an excessive or dangerous high pressure in said conduit. Furthermore, in case of a break occurring in the conduit 6, the amount of discharge is limited by this same means.

From the foregoing, it will be appreciated that I construct the parts and so arrange them that all movements of parts are dampened which tends to smooth out the operation of the entire assembly and prevent the occurrence of sudden surges or shocks in the low pressure conduit or distributing system. At the same time, I convert into weight the pressure differential across orifice 7 by causing it to transfer a liquid body of substantial weight, which causes the pressure in the inlet end of the conduit 6 to vary directly with any variation in volume of flow into it, and by doing this, I compensate for any frictional losses as the fluid passes through conduit 6 to a distant point of discharge or emission, and thereby maintain a constant pressure at distant points of discharge from conduit 6.

Figures 7, 8:
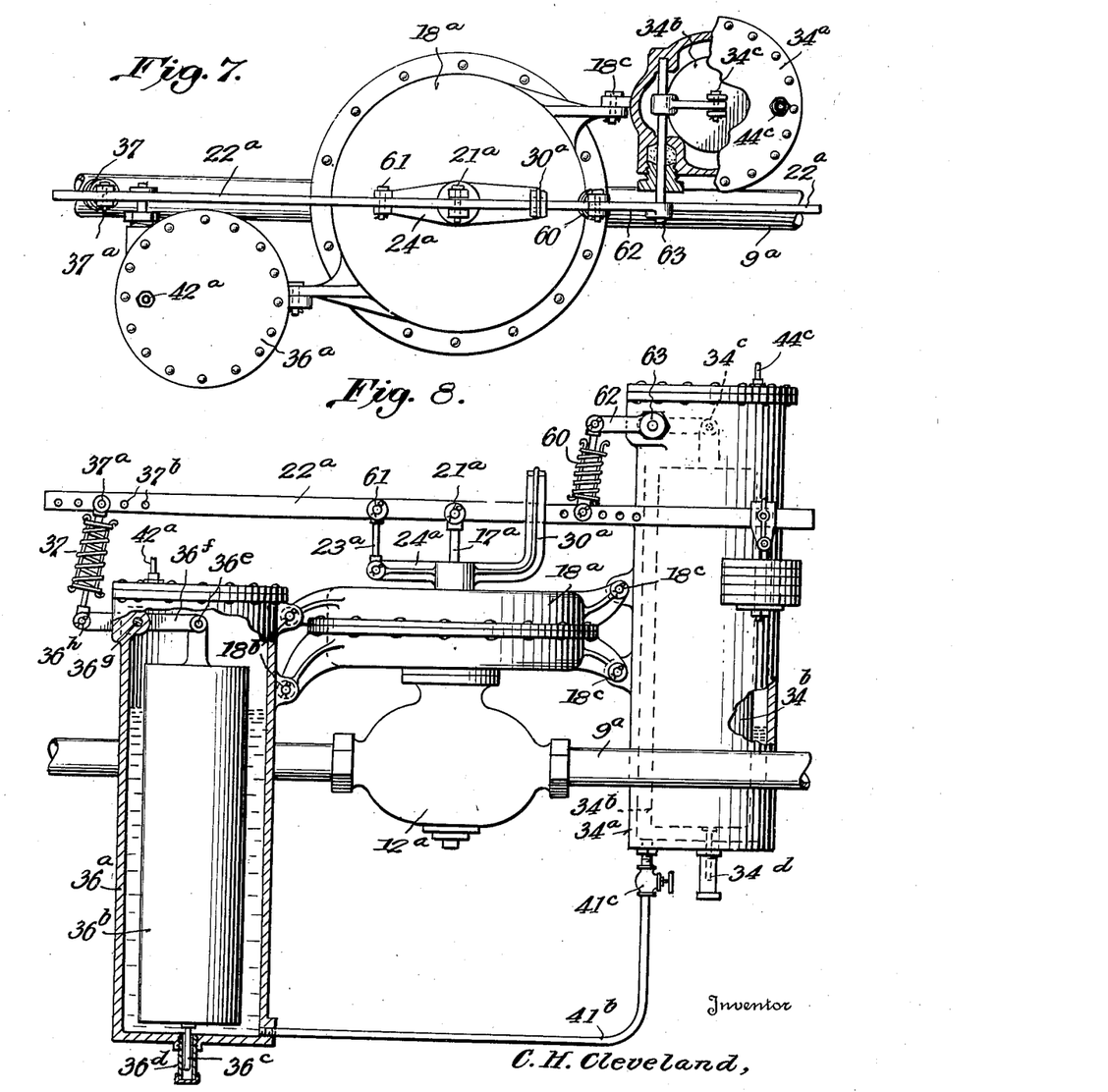
Fig. 7 is a fragmentary top plan view partly in horizontal section of a modification.
Fig. 8 is a side elevation of the structure shown in Fig. 7 partly in vertical section.

Instead of having the liquid containers carried by the fulcrum bar and influencing the operation of such bar, I may employ the modification shown in Figs. 7 and 8. In this construction the pilot valve 12a is interposed in the by-pass line 9a and has a stem 17a passing through its diaphragm casing 18a. The fulcrum bar 22a is pivotally mounted upon a link 23a carried by an arm 24a. The arm is rigidly united with an upstanding guide 30a for the fulcrum bar.

A liquid container 36a is supported by the diaphragm casing as shown at 18b. A second liquid container 34a is rigidly supported by the diaphragm casing as indicated at 18c. A float 36b is arranged in the container 36a and is influenced by the height of the liquid in said container. The float is guided vertically by a pin 36c at its lower end which operates in a vertical guide 36d at the bottom of the container.

The upper end of the float is pivotally connected at 36e to the inner end of a rocking lever 36f, pivotally mounted at 36g on the wall of the container. The outer end of the lever is pivotally connected at 36h to the lower end of a spring link 37, the upper end of which is adjustably secured to one end portion of the fulcrum bar by means of a pin 37a adapted to be inserted through various holes 37b of the fulcrum bar.

Another spring link 60 has its lower end adjustably secured to the fulcrum bar at the opposite side of its rocking point 61, and the upper end of the link is connected to the outer end of a lever 62 pivotally mounted at 63 on the wall of the container 34a. A float 34b operates in the container in a manner similar to the float 36b and has its upper end pivotally connected at 34c to the inner end of the lever 62.

Tubes 42a and 44a corresponding to the tubes 42 and 44 in Fig. 1, are connected respectively to the upper ends of the containers 36a and 34a.

In this embodiment it will be obvious that the floats 36b and 34b perform the same function as the containers 36 and 34 of Fig. 1.

In the modification the lower end of the tanks or containers are in communication by means of a tube 41b having an interposed valve 41c for restricting the flow of liquid from each tank to the other.

Figures 9, 10:
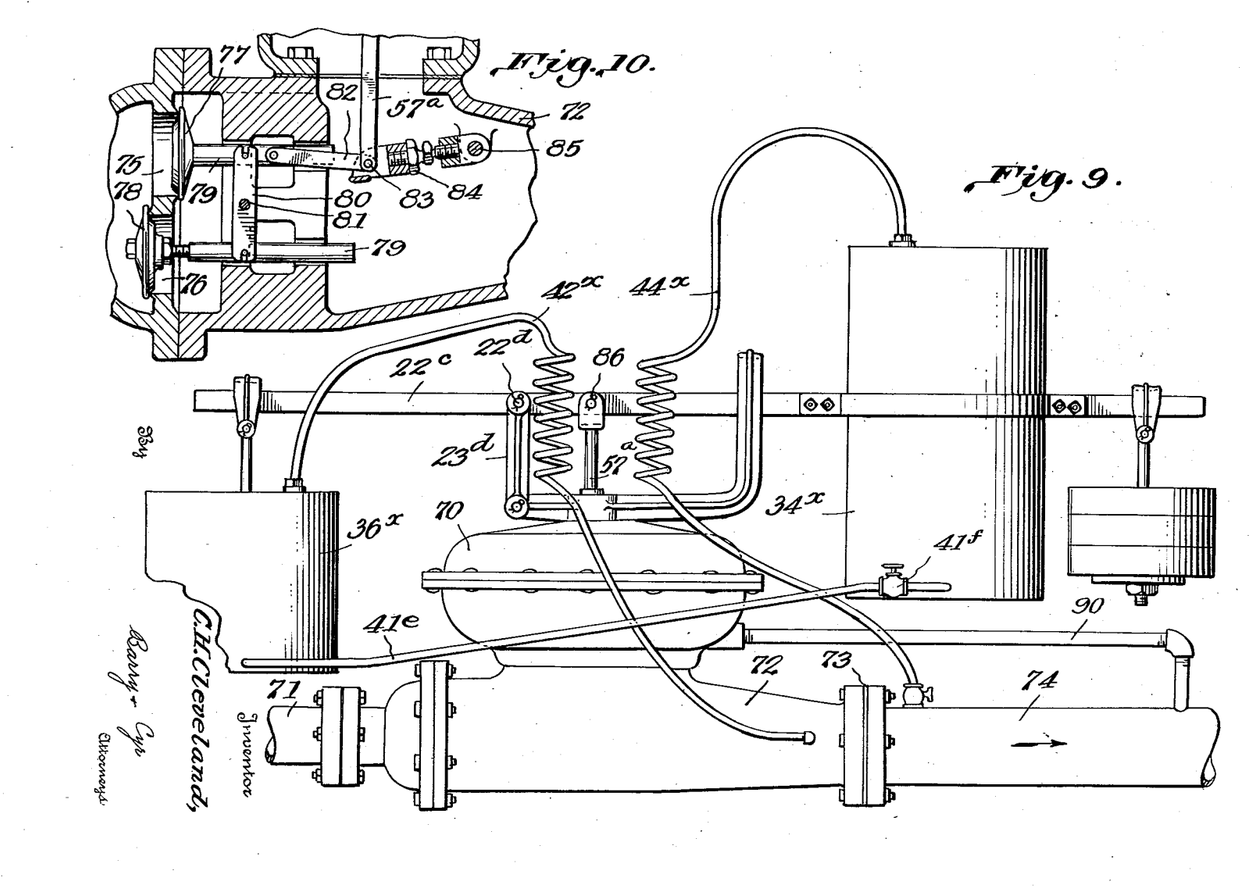
Fig. 9 is a side elevation of a further modification in which my improvements are applied to the main regulator of the system.
Fig. 10 is a vertical sectional view of a portion of the structure shown in Fig. 9, and illustrating the type of balanced valve that may be employed in the main regulator.

Instead of using my improved means on the pilot valve, I may employ it in connection with the main valve which is controlled by the main regulator 70 (Fig. 9). In this form of the invention 71 is the upstream pipe, 72 the casing of the main valve, 73 the orifice plate, and 74 the downstream pipe.

As best shown in Fig. 10, the gas passing through the valve is controlled by a balanced valve structure. For example, the valve has two ports 75 and 76, the former closed by a valve head 77 closing in the upstream direction, and the latter being closed by a valve head 78 closing in the downstream direction. These valves have stems 79 which are slidable in the valve casing and are connected by a lever 80 that rocks on a fulcrum 81. This causes the valves to simultaneously close while moving in opposite directions.

A link 82 is connected at 83 to the main stem 57a of the valve, and at the point of connection the parts 82 and 57a are connected to one end of another link 84 pivotally mounted at 85 within the valve casing.

The main stem of the valve passes upwardly through the regulator and is pivotally connected at 86 to a fulcrum bar 22c pivotally mounted at 22d on a link 23d carried by the main regulator casing.

The fulcrum bar like the one shown in Figs. 1 and 2, carries liquid containers 36x and 34x, which have their lower ends in communication by means of a tube 41e having a valve 41f interposed therein. Of course, the liquid containers are supported by the fulcrum bar and arranged at opposite sides of the pivot point 22d and they have their upper ends communicating with the pipe line at opposite sides of the orifice plate 73 by means of pipes 42x and 44x corresponding to the tubes 42 and 44.

A pipe 90 places the diaphragm chamber of the regulator in communication with the pipe line at the downstream side of the orifice plate.

All operating functions in the structure illustrated in Figs. 9 and 10 are the same as those shown in Figs. 1 and 2, except that the liquid tanks and the transfer of liquid weight is applied directly to the master regulator diaphragm instead of to the diaphragm of the pilot valve.

Other modifications of the invention will be apparent to those skilled in the art without departing therefrom or from the scope of the claims, and I am aware that various changes may be made in the structures disclosed without departing from the invention as expressed in the claims.

What I claim and desire to secure by Letters Patent is:

1. In a flow control system of the type having a high-pressure line, a low pressure line, a flow-restricting element interposed between the two, a control valve interposed in the high pressure line adjacent to the flow-restricting element, a pressure responsive device connected to the control valve for actuating said valve, and means for controlling the operation of said pressure responsive device, the improvement in said means comprising a fulcrum bar, liquid containers associated with the bar at opposite sides of its fulcrum, a passageway placing the lower portions of said containers in communication, a passageway placing the upper portion of one of the containers in communication with the high pressure line at the upstream side of the flow-restricting element, another passageway placing the upper portion of the other container in communication with the low pressure line at the downstream side of said flow-restricting element, and means interposed in one of said passageways for restricting the flow of fluid therethrough.

2. In a flow control system of the type having a high-pressure line, a low-pressure line, a flow-restricting element interposed between the two, a control valve interposed in the high-pressure line adjacent to the flow-restricting element, a pressure responsive device connected to the control valve for actuating said valve, and means for controlling the operation of said pressure responsive device, the improvement in said means comprising a fulcrum bar, liquid containers operatively associated with the bar at opposite sides of its fulcrum and adapted due to the amount of liquid contained therein to control the movement of the fulcrum bar, a passageway placing the lower portions of said containers in communication, a flow-restricting element interposed in said passageway, another passageway placing the upper portion of one of the containers in communication with the high-pressure line at the upstream side of the first-mentioned flow-restricting element, and a third passageway placing the upper portion of the container in communication with the low-pressure line at the downstream side of the first-mentioned flow-restricting element.

3. In a flow control system of the type having a high pressure line, a low pressure line, a flow-restricting element interposed between the two, and a control valve interposed in the high pressure line adjacent to the flow-restricting element, the improved means for controlling said valve comprising a diaphragm, a fulcrum bar operatively connected to the diaphragm, liquid containers supported by the fulcrum bar at opposite sides of its fulcrum, means placing the lower portions of said containers in communication, a passageway placing the upper portion of one of the containers in communication with the high pressure line at the upstream side of the flow-restricting element, and another passageway placing the upper portion of the other container in communication with the low pressure line at the downstream side of said flow-restricting element.

4. In a flow control system of the type having a high pressure line, a low pressure line, a flow-restricting element interposed between the two, and a control valve interposed in the high pressure line adjacent to the flow-restricting element, the improved means for controlling said valve comprising a diaphragm, a fulcrum bar operatively connected to the diaphragm, liquid containers supported by the fulcrum bar at opposite sides of its fulcrum, means placing the lower portions of said containers in communication, a passageway placing the upper portion of one of the containers in communication with the high pressure line at a point between said valve and said flow-restricting element, and another passageway placing the upper portion of the other container in communication with the low pressure line at the downstream side of said flow-restricting means.

5. In a flow control system of the type having a high pressure line, a low pressure line, a control valve in the high pressure line, a flow-restricting element interposed between the two lines, a by-pass for leading fluid from the high pressure line past the control valve and flow-restricting element to the low pressure line, means responsive to changes in pressure in the by-pass pipe for controlling the control valve, and a pilot valve for controlling the flow of fluid through the by-pass pipe, the improvement which comprises a liquid transfer apparatus controlled by differential pressures across the flow-restricting element and controlling said pilot valve.

6. A flow control system of the type having a high pressure line, a low pressure line, a control valve and a flow-restricting element interposed between the two, a by-pass pipe for leading fluid from the high pressure line past the control valve and flow-restricting element to the low pressure line, means governed by the pressure of the fluid in a portion of the by-pass pipe for controlling said control valve, and a pilot valve for controlling the flow of fluid through the by-pass pipe, the improvement which comprises a fulcrum bar operatively connected to the pilot valve, liquid containers supported by the fulcrum bar at opposite sides of its fulcrum, means placing the lower portion of said containers in communication, a passageway placing the upper portion of one of the containers in communication with one of said lines at a point between the control valve and flow-restricting element, and another passageway placing the upper portion of the other container in communication with the low pressure line at the downstream side of said flow-restricting element.

7. In a flow control system of the type having a high pressure line, a low pressure line, a flow-restricting element interposed between the two, a control valve interposed in the high pressure line adjacent to the flow-restricting element, and means for controlling said valve, the improvement comprising a diaphragm, a valve stem extending through the diaphragm, a tubular member surrounding the valve stem, a fulcrum link supported by the tubular member, a fulcrum bar having its medial portion pivotally mounted on the fulcrum link, said valve stem being pivotally connected to the fulcrum bar at one side of its fulcrum point, adjustable means cooperating with said link to maintain the valve stem out of contact with said tubular member, liquid containers supported by the fulcrum bar at opposite sides of its fulcrum, means placing the lower end portions of the containers in communication, a passageway placing the upper portion of one of said containers in communication with one of said lines at the upstream side of said flow-restricting element, and a second passageway placing the upper portion of the other container in communication with the low pressure line at the downstream side of the flow-restricting element.

8. In a flow control system of the type having a high pressure line, a low pressure line, a flow-restricting element interposed between the two, a control valve interposed in the high pressure line adjacent to the flow-restricting element, and means for controlling said valve, the improvement comprising a diaphragm, a valve stem extending through the diaphragm, a tubular member surrounding the valve stem, a fulcrum link supported by the tubular member, a fulcrum bar having its medial portion pivotally mounted on the fulcrum link, said valve stem being pivotally connected to the fulcrum bar at one side of its fulcrum point, adjustable means cooperating with said link to maintain the valve stem out of contact with said tubular member, liquid containers supported by the fulcrum bar at opposite sides of its fulcrum, means placing the lower end portions of the containers in communication, a passageway placing the upper portion of one of said containers in communication with one of said lines at the upstream side of said flow-restricting element, a second passageway placing the upper portion of the other container in communication with the low pressure line at the downstream side of the flow-restricting element, and adjustable weights mounted on the fulcrum bar at opposite sides of its fulcrum.

9. In a flow control-system of the type having a high pressure line, a low pressure line, a flow-restricting element interposed between the two, a control valve interposed in the high pressure line adjacent to the flow restricting element, a pressure responsive device connected to the control valve for actuating said valve, and means for controlling the operation of said pressure responsive device, the improvement in said means comprising a fulcrum bar, liquid containers supported by the fulcrum bar at opposite sides of its fulcrum, means placing the lower portions of said containers in communication, a passageway placing the upper portion of one of the containers in communication with the high pressure line at the upstream side of the flow-restricting element, and another passageway placing the upper portion of the other container in communication with the low pressure line at the downstream side of said flow-restricting element.

10. In a flow control system of the type having a high pressure line, a low pressure line, a flow-restricting element interposed between the two, a control valve interposed in the high pressure line adjacent to the flow-restricting element, a pressure responsive device connected to the control valve for actuating said valve, and means for controlling the operation of said pressure responsive device, the improvement in said means comprising a fulcrum bar, liquid containers supported by the fulcrum bar at opposite sides of its fulcrum, means placing the lower portions of said containers in communication, a passageway placing the upper portion of one of the containers in communication with the high pressure line at the upstream side of the flow-restricting element, and another passageway placing the upper portion of the other container in communication with the low pressure line at the downstream side of said flow-restricting element, one of said containers being adjustable along the fulcrum bar.

11. In a flow control system of the type having a high pressure line, a low pressure line, a flow-restricting element interposed between the two, a control valve interposed in the high pressure line adjacent to the flow-restricting element, a pressure responsive device connected to the control valve for actuating said valve, and means for controlling the operation of said pressure responsive device, the improvement in said means comprising a fulcrum bar, liquid containers supported by the fulcrum bar at opposite sides of its fulcrum, means placing the lower portions of said containers in communication, a passageway placing the upper portion of one of the containers in communication with the high pressure line at the upstream side of the flow-restricting element, and another passageway placing the upper portion of the other container in communication with the low pressure line at the downstream side of said flow-restricting element, one of said containers being adjustable upwardly and downwardly on the fulcrum bar relatively to the other container.

12. In a flow control system of the type having a high pressure line, a low pressure line, a flow-restricting element interposed between the two, a control valve interposed in the high pressure line adjacent to the flow-restricting element, a pressure responsive device connected to the control valve for actuating said valve, and means for controlling the operation of said pressure responsive device, the improvement in said means comprising a fulcrum bar, liquid containers supported by the fulcrum bar at opposite sides of its fulcrum, means placing the lower portions of said containers in communication, a passageway placing the upper portion of one of the containers in communication with the high pressure line at the upstream side of the flow-restricting element, another passageway placing the upper portion of the other container in communication with the low pressure line at the downstream side of said flow-restricting element, and adjustable weights mounted on the fulcrum bar at opposite sides of its fulcrum.

13. In a flow control system of the type having a high pressure line, a low pressure line, a flow-restricting element interposed between the two, a control valve interposed in the high pressure line adjacent to the flow-restricting element, a pressure responsive device connected to the control valve for actuating said valve, and means for controlling the operation of said pressure responsive device, the improvement in said means comprising a fulcrum bar, liquid containers supported by the fulcrum bar at opposite sides of its fulcrum, means placing the lower portions of said containers in communication, a passageway placing the upper portion of one of the containers in communication with the high pressure line at the upstream side of the flow-restricting element, and another passageway placing the upper portion of the other container in communication with the low pressure line at the downstream side of said flow-restricting element, said passageways including flexible portions to permit the fulcrum bar to move up and down without interference by the passageways.

14. In a flow control system of the type having a high pressure line, a low pressure line, a flow-restricting element interposed between the two, a control valve for controlling the flow of fluid through the high pressure line, a pressure responsive device connected to the control valve for actuating said valve, and means for controlling the operation of said pressure responsive device, the improvement in said means comprising a valve stem, a fulcrum bar operatively connected to said stem, liquid containers supported by the fulcrum bar at opposite sides of its fulcrum, means placing the lower portions of said containers in communication, a passageway placing the upper portion of one of the containers in communication with one of said lines at a point between the control valve and the flow-restricting element, and another passageway placing the upper portion of the other container in communication with the low pressure line at the downstream side of the flow-restricting element.

15. In a flow control system of the type having a high pressure line, a low pressure line, a control valve in the high pressure line, a flow restricting element interposed between the two lines at the downstream side of the valve, a by-pass for leading fluid from the high pressure line past the control valve and flow restricting element to the low pressure line, means responsive to changes in pressure in the by-pass for controlling the control valve, and a pilot valve for controlling the flow of fluid through the by-pass pipe, the improvement in said means for controlling said pilot valve, which comprises a fulcrum bar, liquid containers carried by the bar at opposite sides of the fulcrum, a passageway placing the lower portions of said containers in communication, a passageway placing the upper portion of one of the containers in communication with the high pressure line at the upstream side of the flow restricting element, another passageway placing the upper portion of the other container in communication with the low pressure line at the downstream side of said flow restricting element, and means interposed in one of said passageways for restricting the flow of fluid therethrough.

CHARLES H. CLEVELAND.